United States Patent
Milner et al.

(10) Patent No.: US 10,902,307 B1
(45) Date of Patent: *Jan. 26, 2021

(54) UNIVERSAL INTEGRATED CIRCUIT CARD (UICC) TOOLKIT

(71) Applicant: Sprint Communications Company L.P., Overland Park, KS (US)

(72) Inventors: Adrian M. Milner, Gardner, KS (US); Maksym Siryy, Louisburg, KS (US); Simon Youngs, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/692,758

(22) Filed: Nov. 22, 2019

Related U.S. Application Data

(63) Continuation of application No. 15/793,971, filed on Oct. 25, 2017, now Pat. No. 10,546,222.

(51) Int. Cl.
*H04L 29/06* (2006.01)
*G06K 19/07* (2006.01)
(Continued)

(52) U.S. Cl.
CPC ..... *G06K 19/0723* (2013.01); *G06K 19/0701* (2013.01); *G06K 19/0719* (2013.01);
(Continued)

(58) Field of Classification Search
CPC .......... G06F 21/70; G06F 21/71; G06F 21/72; G06F 21/76; G06F 21/77; H04L 63/08; H04L 63/0853; H04W 12/002; H04W 12/0023; H04W 12/0027; H04W 12/004; H04W 12/00403; H04W 12/00409
See application file for complete search history.

(56) References Cited

U.S. PATENT DOCUMENTS 10,433,156 B1    10/2019   Long et al.
10,546,222 B1    1/2020   Milner et al.
(Continued)

OTHER PUBLICATIONS

First Action Interview Pre-Interview Communication dated Apr. 23, 2019, U.S. Appl. No. 15/961,797, filed Apr. 24, 2018.
(Continued)

*Primary Examiner* — Edward Zee

(57) ABSTRACT

A universal integrated circuit card (UICC) smart card is disclosed. The UICC smart card comprises a processor, a non-transitory memory, a call control application stored in the non-transitory memory, and an application stored in the non-transitory memory. The call control application, when executed by the processor, receives dialed digits from a dialer application executing on a mobile communication device, wherein the UICC smart card is communicatively coupled to the mobile communication device and distributes the dialed digits within the UICC smart card. The application, when executed by the processor, receives the dialed digits distributed by the call control application, identifies a short code included in the dialed digits, selects instructions stored in the non-transitory memory based on the short code, and configures the UICC smart card by causing the processor to execute the selected instructions.

19 Claims, 7 Drawing Sheets

(51) Int. Cl.
*H04W 12/00* (2009.01)
*H04L 9/32* (2006.01)
*H04W 12/06* (2009.01)
*H04B 1/3816* (2015.01)

(52) U.S. Cl.
CPC ........ *G06K 19/0727* (2013.01); *H04L 9/3271* (2013.01); *H04L 63/0435* (2013.01); *H04L 63/06* (2013.01); *H04L 63/08* (2013.01); *H04L 63/0853* (2013.01); *H04W 12/002* (2019.01); *H04W 12/0023* (2019.01); *H04W 12/06* (2013.01); *H04B 1/3816* (2013.01)

(56) References Cited

U.S. PATENT DOCUMENTS

| | | | |
|---|---|---|---|
| 2007/0049269 A1* | 3/2007 | Ophir | H04W 8/06 455/432.1 |
| 2012/0225690 A1* | 9/2012 | Gomez D Az | H04W 8/245 455/558 |
| 2013/0072257 A1 | 3/2013 | Evans et al. | |
| 2015/0349826 A1* | 12/2015 | Li | H04W 8/183 455/558 |
| 2016/0173156 A1 | 6/2016 | Wane | |
| 2017/0026827 A1 | 1/2017 | Yonekura | |

OTHER PUBLICATIONS

Notice of Allowance dated May 24, 2019, U.S. Appl. No. 15/961,797, filed Apr. 24, 2018.
Notice of Allowance dated Sep. 17, 2019, U.S. Appl. No. 15/793,971, filed Oct. 25, 2017.

\* cited by examiner

UNIVERSAL INTEGRATED CIRCUIT CARD (UICC) TOOLKIT

CROSS-REFERENCE TO RELATED APPLICATIONS

This application is a continuation of and claims priority under 35 U.S.C. § 120 to U.S. patent application Ser. No. 15/793,971 filed on Oct. 25, 2017, entitled "Universal Integrated Circuit Card (UICC) Toolkit," by Adrian M. Milner, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A universal integrated circuit card (UICC) is a smart card that may be employed in mobile communication devices to securely store radio access network (RAN) credentials and keys. The UICC may further store a contact list and/or a history of text messages. The UICC comprises both a memory and a processor. Some UICCs are removable and may be packaged with a mobile communication device as a separate kit item in a "shrink wrapped" retail delivery package. After purchase, the package is opened, the UICC is installed into the mobile communication device, and the device undergoes a wireless communication service activation. In other embodiments, however UICCs may be embedded inside a mobile communication device and may not be readily removable by a non-technical user. In some contexts a UICC may be referred to as a subscriber identity module (SIM).

SUMMARY

In an embodiment, a universal integrated circuit card (UICC) smart card is disclosed. The UICC smart card comprises a processor, a non-transitory memory, a call control application stored in the non-transitory memory, and an application stored in the non-transitory memory. The call control application, when executed by the processor, receives dialed digits from a dialer application executing on a mobile communication device, wherein the UICC smart card is communicatively coupled to the mobile communication device and distributes the dialed digits within the UICC smart card. The application, when executed by the processor, receives the dialed digits distributed by the call control application, identifies a short code included in the dialed digits, selects instructions stored in the non-transitory memory based on the short code, and configures the UICC smart card by causing the processor to execute the selected instructions that perform one or more of resetting the UICC to factory settings, launching a browser on the mobile communication device and causing the browser to access a predefined web site content and download a mobile application framework to the mobile communication device, downloading and configuring a preferred roaming list (PRL) in the non-transitory memory, configuring subscriber credentials in the non-transitory memory, or configuring authentication keys in the non-transitory memory.

In another embodiment, a system is disclosed. The system comprises a mobile communication device and a universal integrated circuit card (UICC) smart card. The mobile communication device comprises a first processor, a user interface, a first non-transitory memory, and a dialer application stored in the first non-transitory memory that, when executed by the first processor, receives dialed digits from the user interface and distributes the dialed digits. The UICC smart card comprises a second processor, a second non-transitory memory, a call control application stored in the second non-transitory memory that, when executed by the second processor, receives dialed digits from the dialer application and distributes the dialed digits within the UICC smart card, and an application stored in the second non-transitory memory that, when executed by the second processor, receives dialed digits from the call control application, selects instructions stored in the second non-transitory memory based on the dialed digits, and configures the UICC smart card by causing the selected instructions to be executed by the second processor.

In yet another embodiment, a method of mobile electronic communication is disclosed. The method comprises receiving dialed digits by a dialer application executing on a mobile communication device from a user interface of the mobile communication device, transmitting the dialed digits by the dialer application to a call control application executing on a universal integrated circuit card (UICC) smart card communicatively coupled to the mobile communication device, receiving the dialed digits by the call control application executing on the UICC smart card, and transmitting the dialed digits by the call control application to an application executing on the UICC smart card. The method further comprises identifying a short code in the dialed digits by the application, based on the short code, selecting a set of instructions stored in the UICC smart card by the application, and configuring the UICC smart card by causing the selected set of instructions to be executed by the UICC smart card by the application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
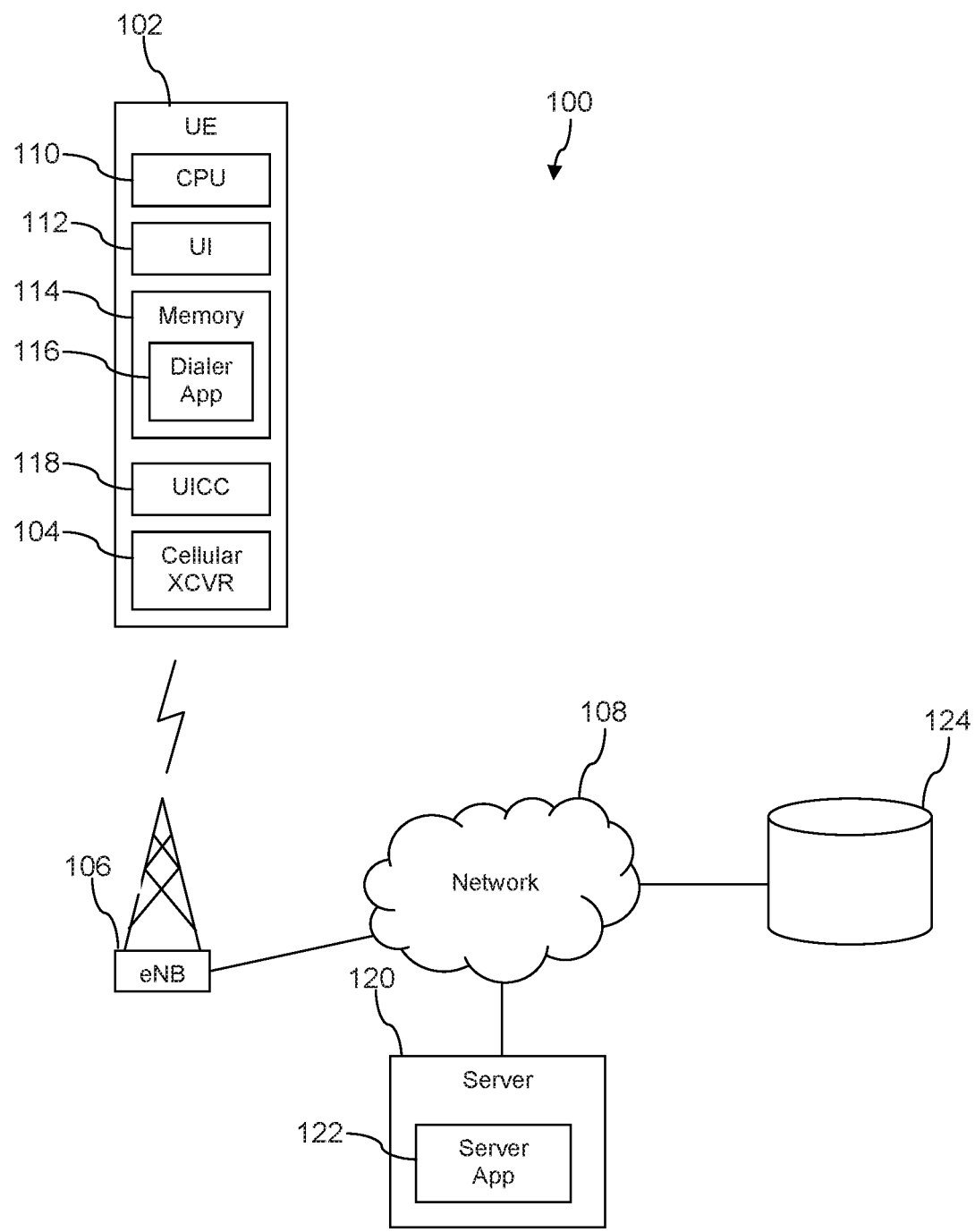
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication service providers in the US are exploring a business model in which service subscribers buy their own mobile communication devices (e.g., smart phones) on an open market rather than buying their device with a subsidy from their service provider. Mobile communication devices delivered to subscribers under this business model may be referred to as open market devices. The open market devices may be generic devices that may be adapted for use in the network of any service provider by installing a universal integrated circuit card (UICC) smart card from the selected service provider into the generic device and then activating the device for service on the service provider's network. Generally, however, these open market devices lack features that support a service provider differentiating their communication service from the service offerings of its competitors. The present disclosure teaches a UICC smart card that provides a mechanism for providing a differentiated wireless communication service to an open market device. By providing this flexibility on a single UICC smart card, rather than providing different UICC smart cards for each of a plurality of supported devices and for each of a plurality of different service plans, this teaching provides the benefits of avoiding costs and sales of multiple separate different UICCs (e.g., multiple separate different subscriber identity modules (SIM cards)), avoiding managing a more complicated inventory.

The UICC smart card taught herein comprises a logical processor and memory. The memory includes some preconfigured bootstrap credentials that may be used by an associated open market device for initial access into the radio access network (RAN) to complete activation and provisioning of wireless service for the open market device. When the open market device is initiating activation, the bootstrap credentials may be used by the device to receive restricted communication service from the RAN for the purpose of reaching out to a provisioning server in the service provider's network to conduct provisioning activities. As part of this provisioning, subscriber credentials associated with the specific subscriber and subscription account may be downloaded via the RAN and stored in the memory of the UICC as well as keys such as digital certificates and/or secure tokens. Thereafter, the subscriber credentials will be used rather than the bootstrap credentials to conduct authentication into the RAN to receive communication service.

The memory of the UICC smart card also includes a call control application and a feature launcher application. The call control application may register with a dialer application of the open market device such that dialed digits received by the dialer application from a user interface (e.g., touchscreen) of the device are shared with the call control application. The call control application may in turn share these dialed digits with a feature launcher application. A user of the open market device may input dialed digits that comprise a short code to the user interface, and these dialed digits may be shared by the dialer application with the call control application and the feature launcher application on the UICC smart card. The feature launcher application analyzes the dialed digits and identifies the short code. The feature launcher application searches the memory for an association of the short code to a set of executable instructions. If the short code-to-instructions association is stored, the feature launcher application causes the processor of the UICC to execute the identified instructions. A plurality of short code-to-instruction set associations may be stored in the UICC smart card. The feature launcher and the plurality of short code-to-instruction set associations may be referred to in some contexts as a UICC toolkit.

The selected instructions may effect a resetting of the UICC to factory settings (e.g., remove the subscriber credentials and keys downloaded during activation and possibly other artifacts in memory on the UICC). The selected instructions may cause a browser to be launched, cause the browser to access a predefined web site content, and download the content to the open market device, for example a mobile application framework program. The selected instructions may cause the processor of the UICC to download one or more current preferred roaming lists. The selected instructions may cause the processor of the UICC to cause the open market device to execute a diagnostic application, collect diagnostic data, and send the diagnostic data back to a predefined server on the network for analysis and troubleshooting of the open market device. Thus, in this way, a user of the open market device may simply access differentiated communication services of the service provider by entering short codes. The user may learn of these short codes from a call to customer care, from a web site associated with the service provider, from a tutorial presented by the open market device, or in some other way.

The UICC smart card taught herein is a technical solution to the technical problem of providing differentiated communication services via an open market device. The specific information technology implementation disclosed herein is flexible enough to support yet further capabilities than identified above, being readily extensible to adding new short code indexed functionalities and other functionalities. Further, the passing through of dialed digits which can carry short codes makes this solution transparent to the open market device, considered independently of the UICC smart card. This information technology implementation has the advantage of not obliging the user to be a technology expert to accomplish the functionality stored in the UICC.

Turning now to FIG. 1, a system 100 is described. In an embodiment, the system 100 comprises a mobile communication device (UE) 102, a cell site (eNB) 106, and a network 108. The mobile communication device 102 may be a mobile phone, a smart phone, a personal digital assistant (PDA), a headset computer, a wearable computer, a laptop computer, a notebook computer, a tablet computer, or other mobile communication device. The mobile communication device 102 comprises a cellular radio transceiver 104 which may establish a wireless communication link with the cell site 106 according to a long term evolution (LTE), a code division multiple access (CDMA), a global system for mobile communication (GSM), or a worldwide interoperability for microwave access (WiMAX) wireless communication protocol. The network 108 comprises one or more public networks, one or more private networks, or a combination thereof. In an embodiment, the mobile communication device 102 may be an open market device.

In an embodiment, the mobile communication device 102 further comprises a processor 110, a user interface 112, a non-transitory memory 114, and a universal integrated circuit card (UICC) smart card 118. In some contexts the processor 110 may be referred to as a first processor and the non-transitory memory 114 may be referred to as a first non-transitory memory. The user interface 112 may be a touchscreen display, a keypad, and/or a microphone. The non-transitory memory 114 comprises a dialer application 116 which may be installed as a native application. A native application is adapted to the hardware of a specific mobile communication device and is installed during the manufacturing process. A native application typically has access to operating system services of the mobile communication device and to peripheral devices on the mobile communication device that user applications may not be granted, for example to avoid untested and/or corrupted user applications from degrading service of the device and/or of a wireless communication network. Said in other words, a native application may be granted operating system access privileges that are greater than the access privileges granted to user installed mobile applications. Native applications may be considered by original equipment manufacturers (OEM) and/or wireless communication service providers to be inherently more secure because the OEM can control the testing of and exercise configuration control over the native applications that they install on the device during manufacturing.

The UICC smart card 118 may be referred to in some contexts as a subscriber identity module (SIM). In an embodiment, the UICC smart card 118 may be a removable smart card. In another embodiment, however, the UICC smart card 118 may be a smart card embedded in the mobile communication device 102 in a semi-permanent way, such that an ordinary consumer is not able to remove the UICC smart card 118 without specialized tools and/or without specialized technical knowledge. The dialer application 116 receives dialed digits from the user interface 112, for example digits input by a user of the device 102.

The system 100 may further comprise a server computer 120 that executes a server application 122 and a content data store 124. In embodiment, a user may input a short code into the user interface 112, the dialer application 116 may receive the short code as dialed digits and pass these along to the UICC smart card 118, and the UICC smart card 118 may access a web page stored in the content data store 124 via the server computer 120 and/or the server application 122.

Figure 2:
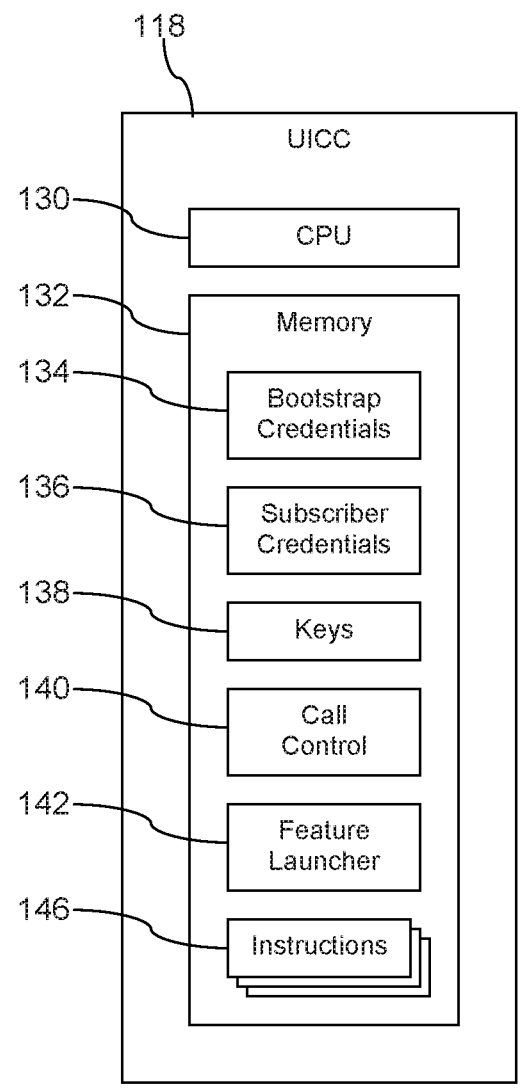
FIG. 2 is a block diagram of a universal integrated circuit card (UICC) according to an embodiment of the disclosure.

Turning now to FIG. 2, further details of the UICC smart card 118 are described. In an embodiment, the UICC smart card 118 comprises a second processor 130 and a second non-transitory memory 132 ('second' with reference to the processor 110 and the memory 114 described above with reference to FIG. 1 which belong to the mobile communication device 102). The second memory 132 may store bootstrap credentials 134, a call control application 140, a feature launcher application 142, and one or more packages or sets of instructions 146. It is understood that the instructions 146 are computer instructions, programs, scripts, coders, or firmware executable by the second processor 130. In some circumstances, for example after the UICC smart card 118 has been installed in the mobile communication device 102 and after the device 102 has been activated to receive wireless communication service from a service provider's network, the second memory 132 may further store subscriber credentials 136 and one or more keys 138. In an embodiment, the UICC smart card 118 may be a 2FF removable smart card, a 3FF removable smart card, or a 4FF removable smart card. In an embodiment, the UICC smart card 118 may be an MFF2 embedded smart card.

When the mobile communication device 102 is first put into service (e.g., after initial purchase) the UICC smart card 118 may not be provisioned for general communication service on a radio access network (RAN) of a wireless communication service provider. In this case, the device 102 may access the bootstrap credentials 134 in the UICC smart card 118 and provide these to the cell site 106 to obtain communications connectivity to the network 108. The network 108 may restrict the communications activities it offers to the device 102 based on authentication with the bootstrap credentials 134, for example restricting communication routes to servers used to provision the device 102 to receive communication service. The provisioning may involve identifying a previously staged subscription account associated with a user of the device 102 and/or with a unique identifier of the device 102. When the subscription has been staged in this way, in response to receiving a service activation request from the mobile communication device 102, a provisioning server (not shown) may generate subscriber credentials, keys, and/or digital security certificates. The provisioning server may store those credentials, keys, and/or digital security certificates in one or more data stores within the network 108. The provisioning server may further provision data about the mobile communication device 102 in a home location register (HLR) data store (not shown). The provisioning server may transmit the subscriber credentials, keys, and/or digital security certificates to the mobile communication device 102, and the mobile communication device 102 may store them in the UICC smart card 118. When the mobile communication device 102 later attempts to connect to the network 108 and/or to the RAN it may look up the subscriber credentials 136 in the UICC 118 and provide these for authentication into the RAN.

A problem can arise if the mobile communication device 102 is transferred or sold to another user. In this case, the wireless communication service provisioning for the mobile communication device 102 may be deleted or canceled in the network 108, but the subscriber credentials 136 may remain store in the UICC smart card 118. When the new owner of the device 102 attempts to activate the phone to his or her own wireless communication service account, the device 102 automatically attempts to authenticate into the RAN using the now obsolete and unsupported subscriber credentials 136 and the connection request fails.

As taught herein, the call control application 140 is configured to register to receive dialed digits from the dialer application 116. To return the UICC smart card 118 to its initial state (i.e., erasing the subscriber credentials 136 and the keys 138 from the second non-transitory memory 132), a user of the device 102 may enter a short code to the user interface 112. The dialer application 116 receives the short code as dialed digits and passes those dialed digits on to the call control application 140 on the UICC smart card 118. The call control application 140 passes the dialed digits on to the feature launcher application 142. The feature launcher application 142 analyzes the dialed digits to determine if it includes a short code that is associated with a set of instructions 146. If the dialed digits includes a short code that is associated with a set of instructions 146, the feature launcher application causes the second processor 130 to execute that set of instructions 146 (i.e., 'launching' that set of instructions). In an embodiment, the call control application 140 may analyze the dialed digits to determine that it comprises a short code and then pass that short code to the feature launcher application 142. If the call control application 140 determines that received dialed digits do not comprise a short code, it does not pass anything to the feature launcher application 142, thereby relieving the feature launcher application 142 from analyzing those dialed digits.

A first short code may be associated to a set of instructions 146 that, when executed by the second processor 130, erases the subscriber credentials 136 and any keys 138 stored in the second non-transitory memory 132. A user of the mobile communication device 102 may learn from a web site, from a call to customer care, or from a user guide what short code to enter to invoke the set of instructions 146 that causes the subscriber credentials 136 and any keys 138 to be erased from the second non-transitory memory 132. This action may be referred to as resetting the UICC smart card 118 to factory default settings.

A second short code may be associated to a set of instructions 146 that, when executed by the second processor 130, launches a web browser and causes that web browser to access content from a uniform resource locator (URL) predefined in that set of instructions. This may be used to download and install a mobile application into the non-transitory memory 114 of the mobile communication device 102. The mobile application may be an application that can be provided by a wireless communication service provider to differentiate its wireless service provided to an open market device such as the device 102. Different short codes may be input by the user to download and install different differentiating features onto the mobile communication device 102. The web browser may reach out to the server 120 and/or server application 122—via the cell site 106 and the network 108—to request the content and/or mobile application installation package from the data store 124.

Different short codes may be used to launch the browser and direct it to different URLs to download and install different mobile applications. One mobile application that may be downloaded and installed, based on the user inputting the associated short code into the user interface 112, is a mobile application framework. The mobile application framework may provide functionality to the device 102 that facilitates downloading and installing other mobile applications. The mobile application framework may provide access to a mobile application store supported by the wireless communication service provider. These may be complimentary mobile applications that do not require the subscriber to pay for the applications. Alternatively, some of the mobile applications may entail the user paying for download and installation. The mobile application framework may mediate download and installation of mobile applications, thereby unburdening the user of performing a series of steps to complete mobile application installation. For example, the mobile application framework can retrieve keys 138 from the UICC smart card 118 and interwork with an operating system of the mobile communication device 102 to set-up appropriate access privileges for the mobile application being installed.

In an embodiment, the mobile application framework may be used to download and install a visual voicemail client application on the mobile communication device 102, thereby providing a distinctive, carrier-specific experience for users of the open market device. In an embodiment, the mobile application framework may be used to download and install self-service applications or self-help applications the assist users in setting up and configuring the mobile communication device 102, as an additional distinctive, carrier-specific feature.

A third short code may be associated to a set of instructions 146 that, when executed by the second processor 130, causes the device 102 to download and install a current preferred roaming list (PRL), for example by reaching out to the server 120 and/or server application 122 to access the PRL stored in the data store 124. Wireless service providers commonly update their PRLs as business agreements with roaming partners change over time and as cell sites 106 are decommissioned and other cell sites 106 newly commissioned for service. There may be no conventional way for non-technical users to update the PRL of an open market device (e.g., a mobile communication device 102 that is not pre-loaded with proprietary service provider applications). The use of an appropriate short code and the feature launcher application 142 on the UICC smart card 118 taught herein is a technical solution to this technical problem.

A fourth short code may be associated with a set of instructions 146 that, when executed by the second processor 130, places the mobile communication device 102 in a diagnostics mode of operation wherein the device 102 collects diagnostic data and sends this collected information back to the service provider, for example the server 120 and/or server application 122, for analysis and troubleshooting of service shortfalls experienced by the device 102.

In an embodiment, one or more mobile applications that execute on the mobile communication device 102 may generate heartbeat messages that are intended to be sent back to a server (not shown) attached to the network 108 to demonstrate that the subject mobile application is still in service on the device 102. For example, the mobile application may be a mobile advertising framework that mediates presentation of mobile applications on the device 102 in exchange for a reduced communication subscription service fee or complete waiver of the service fee. To police the compliance of the user with the agreement, the mobile application may periodically send messages to a server in the network 108 thereby confirming operation of the mobile advertising framework. In an embodiment, the mobile advertisement framework may offer mobile advertisements for viewing on the device 102 and confirm that at least an agreed number of these mobile advertisements are selected for viewing by the user per unit of time, in consideration or a reduced or waived service fee. The UICC smart card 118 may store one or more heartbeat messages in the non-transitory memory 132 during times of wireless coverage outages and take action to transmit the stored heartbeat messages to the appropriate server or servers coupled to the network 108 when wireless coverage is restored.

Figure 3:
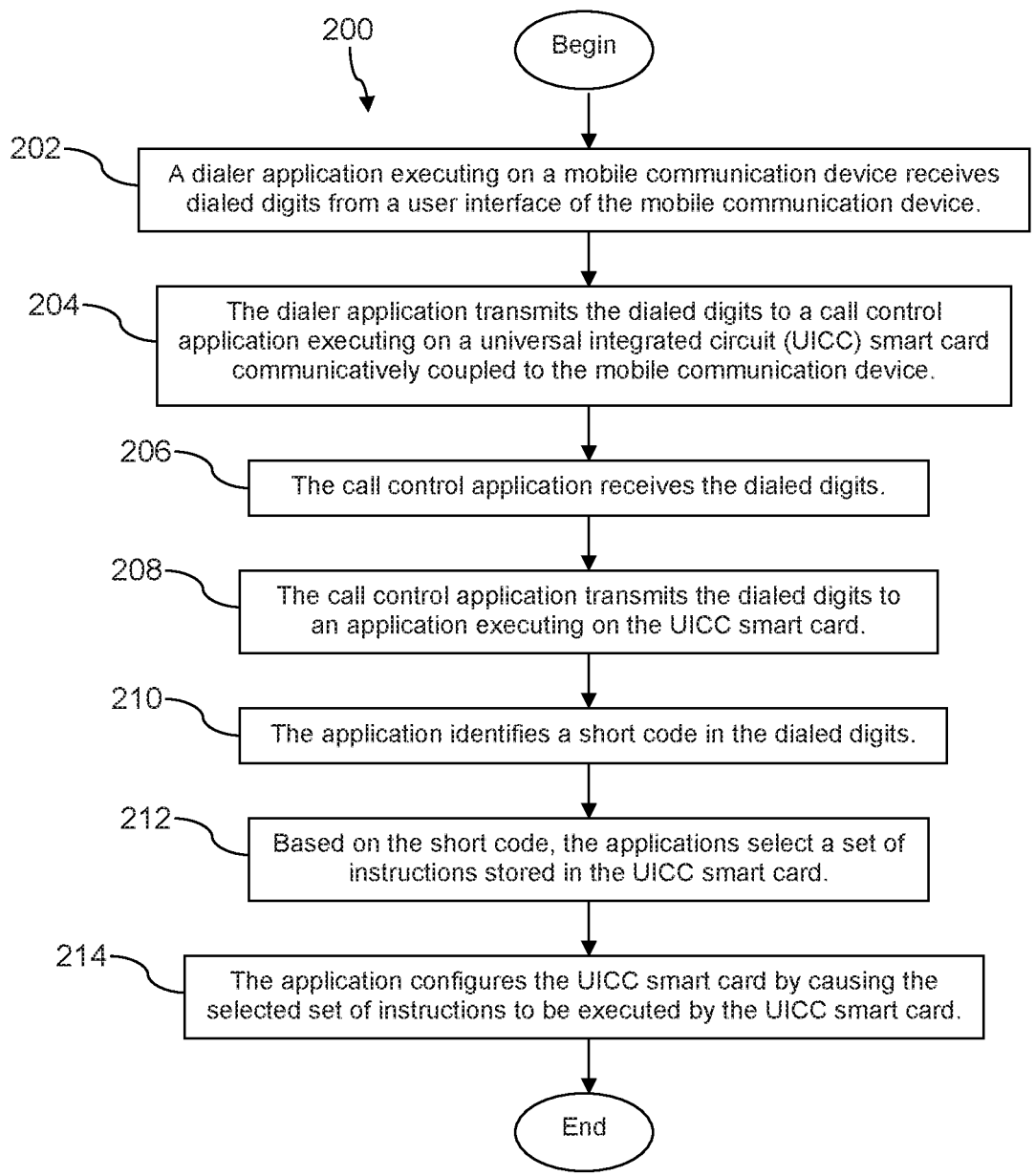
FIG. 3 is a flow chart of another method according to an embodiment of the disclosure.

Turning now to FIG. 3, a method 200 is described. At block 202, a dialer application executing on a mobile communication device receives dialed digits from a user interface of the mobile communication device. At block 204, the dialer application transmits the dialed digits to a call control application executing on a universal integrated circuit (UICC) smart card communicatively coupled to the mobile communication device. At block 206, the call control application receives the dialed digits.

At block 208, the call control application transmits the dialed digits to an application executing on the UICC smart card. At block 210, the application identifies a short code in the dialed digits. Based on the short code, the applications select a set of instructions stored in the UICC smart card. At block 212, the application causes the selected set of instructions to be executed by the UICC smart card. In an embodiment, the method 200 further comprises storing heartbeat messages generated by an application executing on the mobile communication device in a non-transitory memory of the UICC smart card and transmitting the stored heartbeat messages by the mobile communication device to an application server associated with the application that generated the heartbeat messages.

Figure 4:
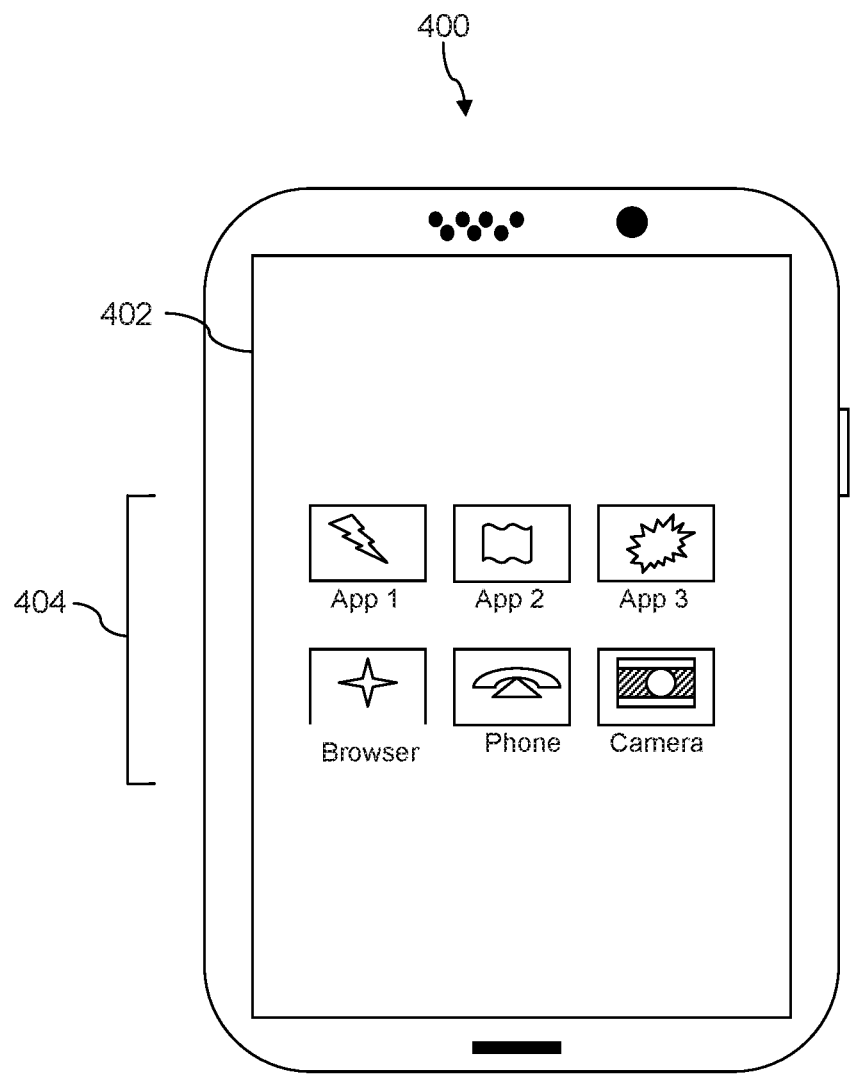
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/ or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
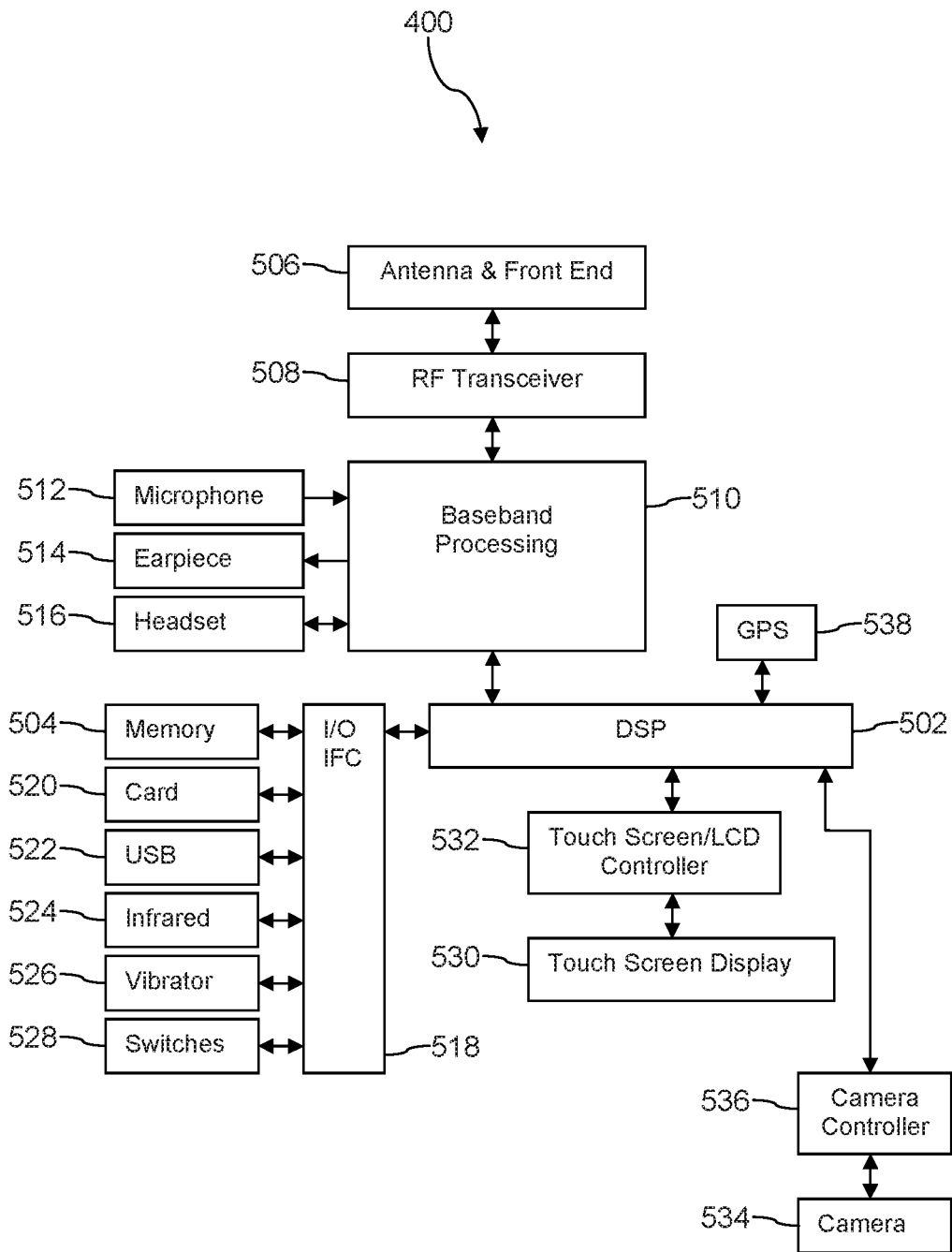
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
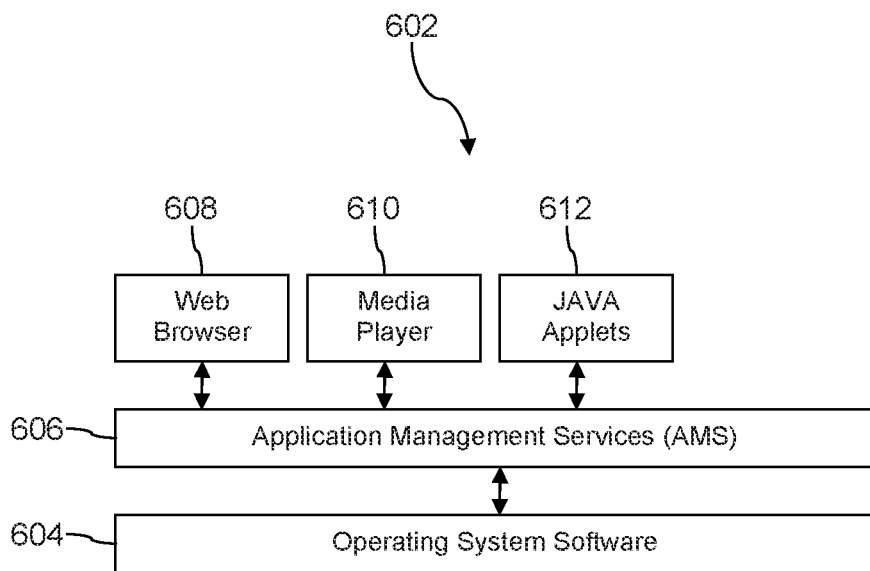
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
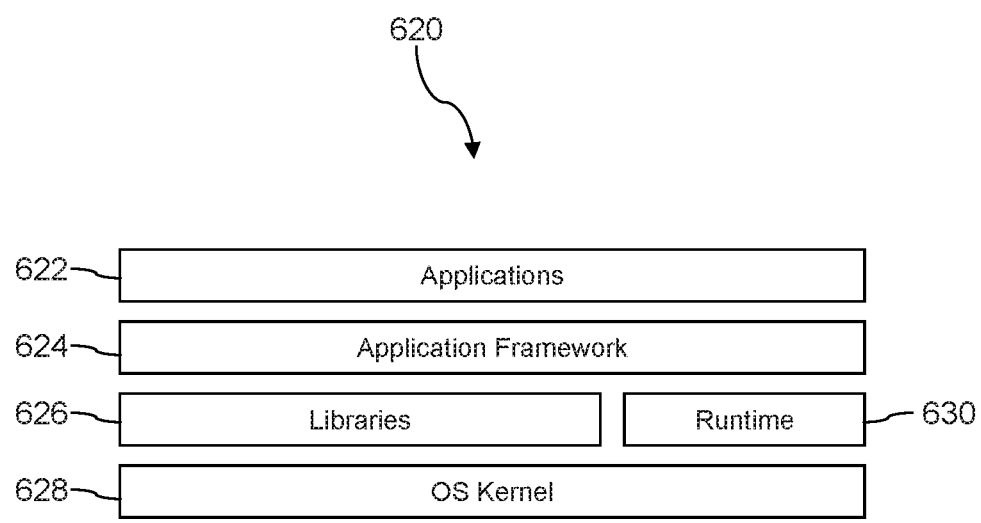
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
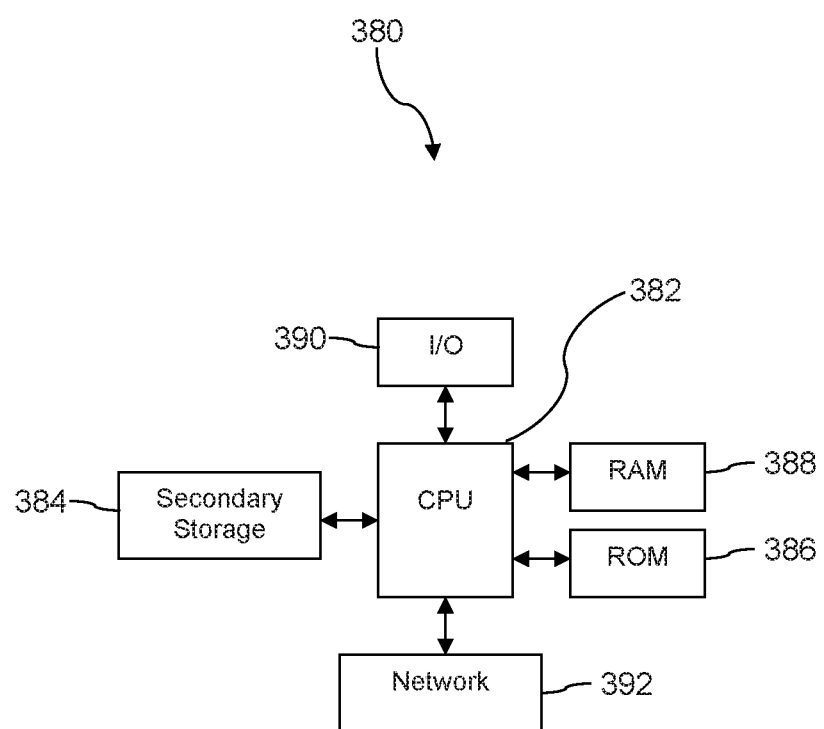
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-transitory storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-transitory memory device which typically has a small memory capacity relative to the larger memory capacity of secondary storage 384. The RAM 388 is used to store transitory data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-transitory memory and transitory memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-transitory memory and transitory memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A universal integrated circuit card (UICC) smart card, comprising:
   a processor;
   a non-transitory memory storing a plurality of instructions and associations between a plurality of short codes and the plurality of instructions, wherein the plurality of short codes and corresponding instructions enable downloading and installation of different features on a mobile communication device when one of the plurality of short codes is input by a user;

a call control application stored in the non-transitory memory that, when executed by the processor,
receives dialed digits from a dialer application executing on the mobile communication device, wherein the UICC smart card is communicatively coupled to the mobile communication device, and
distributes the dialed digits within the UICC smart card; and
an application stored in the non-transitory memory that, when executed by the processor,
receives the dialed digits distributed by the call control application,
identifies a short code included in the dialed digits,
selects instructions of the plurality of instructions stored in the non-transitory memory based on the identified short code, and
configures the UICC smart card by causing the processor to execute the selected instructions that perform launching a browser on the mobile communication device and causing the browser to access a uniform resource locator (URL) defined by the selected instructions and download a mobile application to the mobile communication device.

2. The UICC smart card of claim 1, wherein the UICC smart card is one of a 2FF removable smart card, a 3FF removable smart card, or a 4FF removable smart card.

3. The UICC smart card of claim 1, wherein the UICC smart card is an MFF2 embedded smart card embedded in the mobile communication device.

4. The UICC smart card of claim 1, wherein the mobile communication device is a mobile phone, a smart phone, a personal digital assistant (PDA), a headset computer, a wearable computer, a laptop computer, a notebook computer, or a tablet computer.

5. The UICC smart card of claim 4, wherein the mobile communication device is operable to communicate according to one of a long term evolution (LTE), a code division multiple access (CDMA), a global system for mobile communication (GSM), or a worldwide interoperability for microwave access (WiMAX) wireless communication protocol.

6. The UICC smart card of claim 1, wherein the mobile application comprises a mobile application framework that downloads and installs a visual voicemail client application on the mobile communication device.

7. The UICC smart card of claim 1, wherein the associations comprise a plurality of:
a first short code corresponding with first instructions, that when executed by the processor, reset the UICC smart card to factory default settings,
a second short code corresponding with second instructions, that when executed by the processor, place the mobile communication device in a diagnostics mode of operation,
a third short code corresponding with third instructions, that when executed by the processor, launch the web browser on the mobile communication device and cause the web browser to access the URL defined by the third instructions and to download and install on the mobile communication device the mobile application,
a fourth short code corresponding with fourth instructions, that when executed by the processor, download and configure a preferred roaming list (PRL) in the non-transitory memory, or
a fifth short code corresponding with fifth instructions, that when executed by the processor, configure at least one of subscriber credentials or authentication keys in the non-transitory memory.

8. A system, comprising:
a mobile communication device, comprising:
a first processor,
a user interface,
a first non-transitory memory, and
a dialer application stored in the first non-transitory memory that, when executed by the first processor, receives dialed digits from the user interface and distributes the dialed digits; and
a universal integrated circuit card (UICC) smart card, comprising:
a second processor,
a second non-transitory memory storing a plurality of instructions and associations between a plurality of short codes and the plurality of instructions, wherein at least some of the plurality of short codes and corresponding instructions enable downloading and installation of different features on a mobile communication device when one of the at least some of the plurality of short codes is input by a user,
a call control application stored in the second non-transitory memory that, when executed by the second processor, receives the dialed digits from the dialer application and distributes the dialed digits within the UICC smart card, and
an application stored in the second non-transitory memory that, when executed by the second processor, receives the dialed digits from the call control application, identifies a short code included in the dialed digits, selects instructions of the plurality of instructions stored in the second non-transitory memory based on the identified short code, and configures the UICC smart card by causing the selected instructions to be executed by the second processor, wherein the selected instructions, when executed by the UICC smart card, cause a web browser to be launched on the mobile communication device and download a mobile application to the mobile communication device, and wherein the selected instructions define a uniform resource locator (URL) that the web browser accesses to download the mobile application.

9. The system of claim 8, wherein the mobile communication device is configured to communicate with a wireless communication network according to one of a long term evolution (LTE), a code division multiple access (CDMA), a global system for mobile communication (GSM), or a worldwide interoperability for microwave access (WiMAX) wireless communication protocol.

10. The system of claim 8, wherein the second non-transitory memory stores instructions that, when executed by the second processor, resets the UICC smart card to factory default settings.

11. The system of claim 8, wherein the second non-transitory memory stores instructions that, when executed by the second processor, places the mobile communication device in a diagnostics mode of operation.

12. The system of claim 8, wherein the mobile application comprises a mobile application framework.

13. The system of claim 8, wherein the UICC smart card is one of a 2FF removable smart card, a 3FF removable smart card, or a 4FF removable smart card.

14. The system of claim 8, wherein the UICC smart card is an MFF2 embedded smart card embedded in the mobile communication device.

15. A method of mobile electronic communication, comprising:
receiving dialed digits by a dialer application executing on a mobile communication device from a user interface of the mobile communication device;
transmitting the dialed digits by the dialer application to a call control application executing on a universal integrated circuit card (UICC) smart card communicatively coupled to the mobile communication device, wherein the UICC smart card stores a plurality of instructions and associations between a plurality of short codes and the plurality of instructions, and wherein the associations comprise two or more of a first short code corresponding with first instructions, that when executed by a processor, reset the UICC smart card to factory default settings, a second short code corresponding with second instructions, that when executed by the processor, place the mobile communication device in a diagnostics mode of operation, a third short code corresponding with third instructions, that when executed by the processor, launch a web browser on the mobile communication device and cause the web browser to access a uniform resource locator (URL) defined by the third instructions and to download and install on the mobile communication device a mobile application framework, a fourth short code corresponding with fourth instructions, that when executed by the processor, download and configure a preferred roaming list (PRL) in a non-transitory memory, or a fifth short code corresponding with fifth instructions, that when executed by the processor, configure at least one of subscriber credentials or authentication keys in the non-transitory memory;
receiving the dialed digits by the call control application executing on the UICC smart card;
transmitting the dialed digits by the call control application to a feature launcher application executing on the UICC smart card;
identifying a short code in the dialed digits by the feature launcher application;
based on the identified short code, selecting a set of instructions of the plurality of instructions stored in the UICC smart card by the feature launcher application;
configuring the UICC smart card by causing the selected set of instructions to be executed by the UICC smart card by the feature launcher application;
storing heartbeat messages generated by an application executing on the mobile communication device in a non-transitory memory of the UICC smart card; and
transmitting the stored heartbeat messages by the mobile communication device to an application server associated with the application that generated the heartbeat messages.

16. The method of claim 15, wherein the mobile communication device is a mobile phone, a smart phone, a personal digital assistant (PDA), a headset computer, a wearable computer, a laptop computer, a notebook computer, or a tablet computer.

17. The method of claim 15, wherein the set of instructions, when executed by the UICC smart card, reset the UICC smart card to factory default settings.

18. The method of claim 15, wherein the set of instructions, when executed by the UICC smart card, cause a web browser to be launched on the mobile communication device.

19. The method of claim 18, wherein the set of instructions define a uniform resource locator (URL) that the web browser accesses.

* * * * *